(12) United States Patent
Naruse

(10) Patent No.: US 6,343,022 B1
(45) Date of Patent: Jan. 29, 2002

(54) SEMICONDUCTOR INTEGRATED CIRCUIT DEVICE FOR NON-CONTACT TYPE IC CARD

(75) Inventor: Tomomi Naruse, Tokyo (JP)

(73) Assignee: Fujitsu Limited, Kanagawa (JP)

( * ) Notice: Subject to any disclaimer, the term of this patent is extended or adjusted under 35 U.S.C. 154(b) by 0 days.

(21) Appl. No.: 09/534,227

(22) Filed: Mar. 24, 2000

(30) Foreign Application Priority Data

Oct. 1, 1999 (JP) ............................................ 11-280915

(51) Int. Cl.[7] .............................................. H02M 3/335
(52) U.S. Cl. .......................................... 363/16; 323/347
(58) Field of Search ............................... 363/16, 17, 20, 363/71, 28, 89; 323/264, 347; 235/380; 320/106, 117, 118; 340/531

(56) References Cited

U.S. PATENT DOCUMENTS

| | | | |
|---|---|---|---|
| 4,623,889 A | * 11/1986 | Tanaka et al. | .......... 340/870.37 |
| 4,743,833 A | * 5/1988 | Johnson | ...................... 323/224 |
| 4,816,739 A | * 3/1989 | Sakurai et al. | .............. 323/272 |
| 4,924,171 A | * 5/1990 | Baba et al. | .................. 323/347 |
| 5,200,690 A | * 4/1993 | Uchida | ........................ 320/20 |
| 5,229,708 A | 7/1993 | Donig et al. | |
| 5,418,353 A | * 5/1995 | Katayama et al. | .......... 235/380 |

FOREIGN PATENT DOCUMENTS

| | | |
|---|---|---|
| EP | WO 99 34326 | 7/1999 |
| EP | WO 99 38108 | 7/1999 |
| JP | 1-182782 | 7/1989 |
| JP | 6-291573 | 10/1994 |

OTHER PUBLICATIONS

European Patent Office Search Report, dated Jan. 25, 2001.

* cited by examiner

*Primary Examiner*—Rajnikant B. Patel
(74) *Attorney, Agent, or Firm*—Arent Fox Kintner Plotkin & Kahn, PLLC

(57) ABSTRACT

A semiconductor integrated circuit device for a non-contact type IC card equipped with a rectifying circuit rectifying a received signal and thus producing a power supply voltage is disclosed. A shunt regulator is connected between a power supply voltage and ground, and controls a shunt resistance. A control circuit controls the shunt regulator as follows. The shunt resistance gradually decreases when the power supply voltage becomes higher than an upper limit of a reference voltage range, and gradually increases when the power supply voltage becomes lower than a lower limit thereof. The shunt resistance remains constant when the power supply voltage falls within the reference voltage range.

16 Claims, 12 Drawing Sheets

SEMICONDUCTOR INTEGRATED CIRCUIT DEVICE FOR NON-CONTACT TYPE IC CARD

BACKGROUND OF THE INVENTION

Field of the Invention

The present invention generally relates to semiconductor integrated circuit devices, and more particularly to a semiconductor integrated circuit device for a non-contact type IC card supplied with electricity from a read/write unit.

Electricity is supplied from the read/write unit to the non-contact type IC card in an electromagnetic coupling in which an antenna coil of the read/write unit and an antenna coil of the non-contact type IC card are electromagnetically coupled. In such a formation, electricity obtained in the non-contact type IC card greatly depends on a communication distance between the read/write unit and the non-contact type IC card and power supplied from the read/write unit.

In such a kind of non-contact type IC card, it is expected that the distance between the non-contact type IC card and the read/write unit changes during communication and thus electricity supplied to the non-contact type IC card changes abruptly. In this case, a fault may occur. For example, the non-contact type IC card may malfunction and data may be lost. A failure in communication may also occur.

It is thus required that an LSI device used to construct the non-contact type IC card performs the function of stabilizing the power supply voltage and avoiding a malfunction and communication error resulting from a variation in the power supply voltage, and loss of data due to such a malfunction.

SUMMARY OF THE INVENTION

It is an object of the present invention to provide a semiconductor integrated circuit device capable of operating a non-contact type IC in a stabilized fashion.

A more specific object of the present invention is to provide a semiconductor integrated circuit device for use in a non-contact type IC card capable of avoiding various problems resulting from a variation in electricity supplied to the IC card.

The above objects of the present invention are achieved by a semiconductor integrated circuit device for a non-contact type IC card equipped with a rectifying circuit rectifying a received signal and thus producing a power supply voltage, said device comprising: a shunt regulator which is connected between a power supply voltage and ground and controls a shunt resistance: and a control circuit which controls the shunt regulator so that: the shunt resistance gradually decreases when the power supply voltage becomes higher than an upper limit of a reference voltage range, and gradually increases when the power supply voltage becomes lower than a lower limit thereof: and the shunt resistance remains constant when the power supply voltage falls within the reference voltage range.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

A description will now be given, with reference to FIG. 1, of a non-contact type IC card system including an LSI device related to the present invention in order to facilitate better understanding of the invention.

Figure 1:
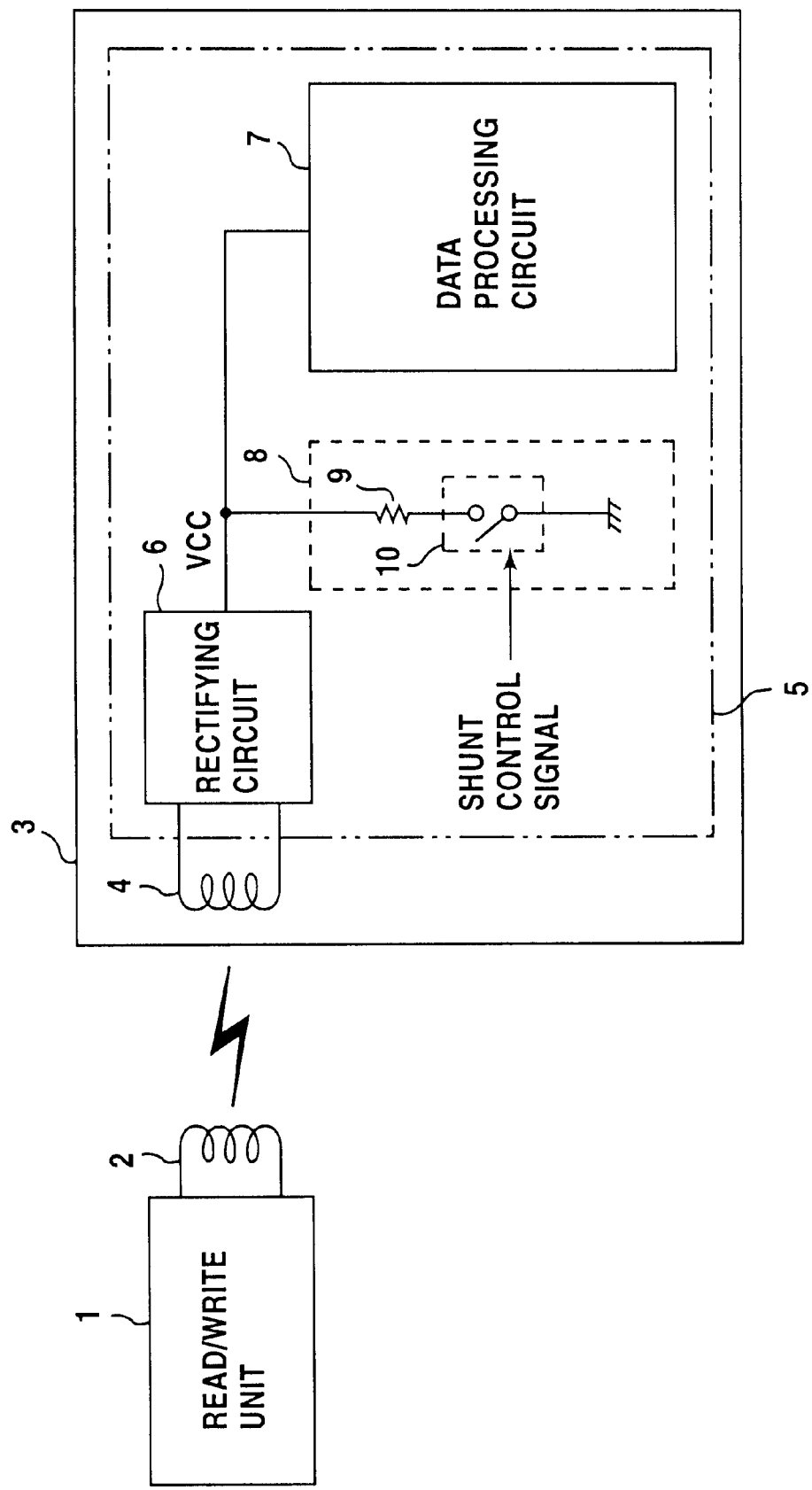
FIG. 1 is a block diagram of a non-contact type IC card system including an LSI device related to the present invention.

Referring to FIG. 1, a non-contact type IC card system includes a read/write unit 1 with an antenna coil 2, and a non-contact IC card 3 having an antenna coil 4 and an LSI device 5 for a non-contact type IC card. The LSI device 5 includes a rectifying circuit 6, a data processing circuit 7, and a shunt regulator 8. The rectifying circuit 6 rectifies a received signal flowing in the antenna coil 4 and thus produce a power supply voltage VCC. The data processing circuit 7 includes a CPU, a memory and a logic circuit. The shunt regulator 8 stabilizes the power supply voltage VCC, and includes a shunt resistor 9, and a switch 10 that is turned ON and OFF in response to a shunt control signal applied thereto.

When the power supply voltage VCC becomes higher than a threshold voltage, the switch 10 of the shunt regulator 8 is turned ON, and a shunt current is caused to flow through the shunt resistor 9. Thus, the power supply voltage VCC can be reduced to the threshold voltage or lower, so that the power supply voltage VCC can be stabilized.

However, the LSI device 5 shown in FIG. 1 has the following problems. If the power supply voltage VCC becomes lower than the threshold voltage, the shunt regulator 8 cannot forcedly increase the power supply voltage VCC. In addition, since the LSI device 5 is equipped with only the single shunt resistor 9, the resistance value of the shunt resistor 9 cannot be changed in accordance with a variation in the power supply voltage VCC. Thus, the power supply voltage VCC cannot be stabilized efficiently and effectively.

As a result, it is impossible to avoid a malfunction and communication error resulting from a variation in the power supply voltage VCC, and loss of data due to such a malfunction.

Figure 2:
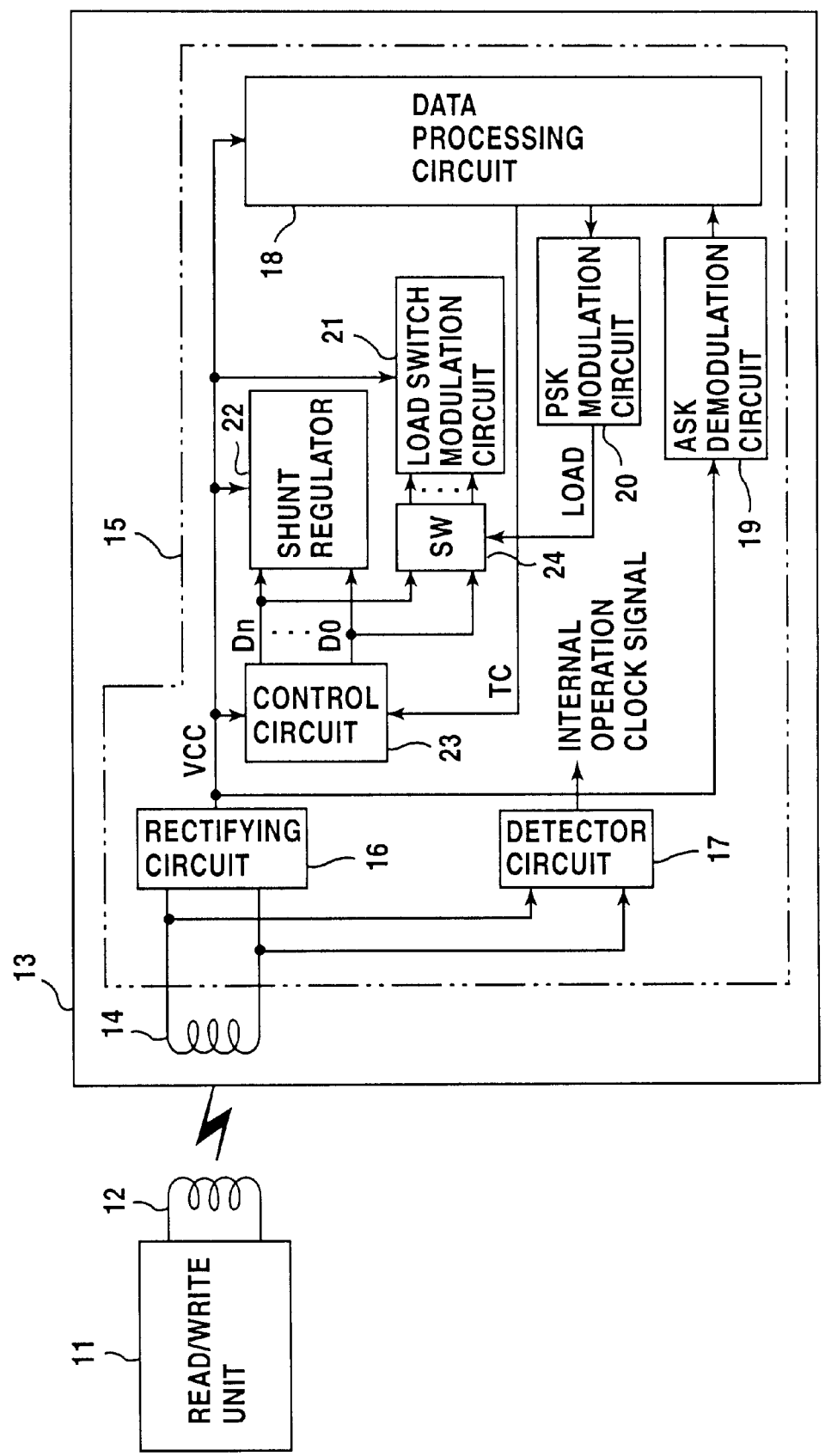
FIG. 2 is a circuit diagram of a non-contact type IC card system including a semiconductor integrated circuit device according to a first embodiment of the present invention.

FIG. 2 is a block diagram of a non-contact type IC card system including an LSI device according to a first embodiment of the present invention. In FIG. 2, parts that are the same as those shown in FIG. 1 are given the same reference numbers.

An LSI device 15 includes a rectifying circuit 16, a detector circuit 17, a data processing circuit 18, an ASK (Amplitude Shift Keying demodulation circuit 19, a PSK (Phase Shift Keying) modulation circuit 20, a load switch modulation circuit 21, a shunt regulator 22, and a control circuit 23. The antenna coil 14 is attached to the LSI device 15.

The rectifying circuit 16 rectifies a received signal flowing through the antenna coil 14 and thus produces the power supply voltage VCC. The detector circuit 17 detects the received signal flowing through the antenna coil 14 and thus produces an internal operation clock. The data processing circuit 18 includes a CPU, a memory, a logic circuit and so on.

The ASK demodulation circuit 19 ASK-demodulates the output signal of the rectifying circuit 16, and outputs received data to the data processing circuit 18. The PSK modulation circuit PSK-modulates transmission data supplied from the data processing circuit 18. The load switch modulation circuit 21 superimposes the modulated transmission data onto the power supply voltage VCC (transmission carrier).

The shunt regulator 22 stabilizes the power supply voltage VCC. The control circuit 23 produces signals D (LSB) to Dn (MSB), which turn ON and OFF connection switches provided in the shunt regulator 22 and connection switches provided in the load switch modulation circuit 21. The connection switch circuit 24 is controlled by a load signal LOAD produced by the PSK modulation circuit 20, and controls a supply of the signals D–Dn output by the control circuit 23.

Figure 3:
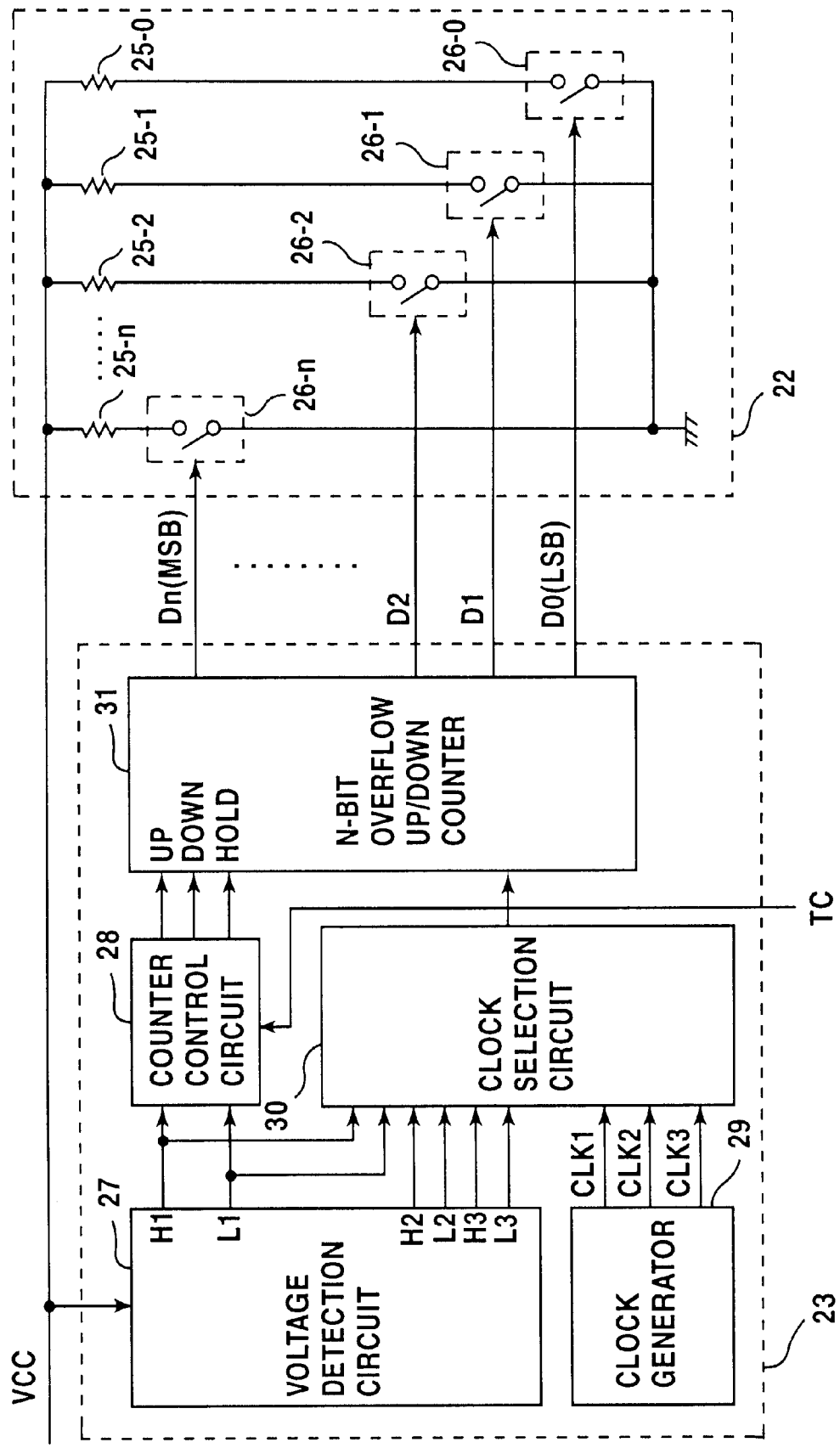
FIG. 3 is a circuit diagram of a shunt regulator and a control circuit shown in FIG. 2.

FIG. 3 is a block diagram of the shunt regulator 22 and the control circuit 23. The shunt regulator 22 includes shunt resistors 25-0, 25-1, 25-2 and 25-n. Shunt resistors 25-3 to 2-(n−1) provided between the shunt resistor 25-2 and the shunt resistor 25-n are not shown for the sake of simplicity.

Let RS be the resistance value of the shunt resistor 25-n, the shunt resistors 25-0, 25-1, 25-2, and 25-(n−1) respectively have resistance values of $RS \times 2^n$, $RS \times 2^{n-1}$, $RS \times 2^{n-2}$ and $RS \times 2$. That is, the shunt resistor 25-k has a resistance value of $RS \times 2^{n-k}$.

The shunt regulator 22 further includes connection switch circuits 26-0–26-n, to which the output signals D0, D1, D2, . . . , Dn are respectively applied as switch control signals. The connection switch circuits 26-3 to 26-(n−1) are not shown for the sake of simplicity. The shunt resistor 25-k and the connection switch circuit 26-k form a unit shunt regulator.

The control circuit 23 is made up of a voltage detection circuit 27, a counter control circuit 28, a clock generator 29, a clock selection circuit 30, and a N-bit overflow up/down counter 31. The voltage detection circuit 27 detects how much the power supply voltage VCC deviates from a reference voltage range in which the operation of the circuit is stable, and outputs voltage detection signals H3, H2, H1, L1, L2 and L3. Table 1 shows the function of the voltage detection circuit 27. In Table 1, VH3, VH2, VH1, VL1, VL2 and VL3 denote predetermined voltages, and a relationship of VH3>VH2>VH1>VL1>VL2>VL3 stands.

TABLE 1

| VCC | H3 | H2 | H1 | L1 | L2 | L3 |
|---|---|---|---|---|---|---|
| VCC ≧ VH3 | H | H | H | H | H | H |
| VH3 ≧ VCC ≧ VH2 | L | H | H | H | H | H |
| VH2 ≧ VCC > VH1 | L | L | H | H | H | H |
| VH1 ≧ VCC > VL1 | L | L | L | H | H | H |
| VL1 > VCC ≧ VL2 | L | L | L | L | H | H |
| VL2 > VCC ≧ VL3 | L | L | L | L | L | H |
| VL3 > VCC | L | L | L | L | L | L |

In the first embodiment of the present invention, the reference voltage range in which the operation is stable is between the upper limit equal to VH1 and the lower limit equal to VL1. If the power supply voltage VCC exceeds the reference voltage range between VH1 and VL1, the power supply voltage VCC is controlled to return thereto.

The voltage detection circuit 27 includes six voltage detectors. The first voltage detector determines whether the power supply voltage VCC is equal to or higher than the voltage VH3. The second voltage detector determines whether the power supply voltage VCC is equal to or higher than the voltage VH2. The third voltage detector determines whether the power supply voltage VCC is equal to or higher than the voltage VH1. The fourth voltage detector determines whether the power supply voltage VCC is equal to or higher than the voltage VL1. The fifth voltage detector determines whether the power supply voltage VCC is equal to or higher than the voltage VL2. The sixth voltage detector determines whether the power supply voltage VCC is equal to or higher than the voltage VL3.

The counter control circuit 28 receives the voltage detection signals H1 and L1 output from the voltage detection circuit 27, and outputs counter control signals UP and DOWN. Table 2 shows the function of the counter control circuit 28. In Table 2, when UP and HOLD are both high (H), HOLD has priority over UP.

TABLE 2

| H1 | L1 | UP | DOWN | HOLD |
|---|---|---|---|---|
| H | H | H | L | L |
| L | H | H | L | H |
| L | L | L | H | L |

At the time of sending data, the counter control circuit 28 is controlled by a transmission control signal TC output from the data processing circuit 18, and operates so that UP=H, DOWN=L and HOLD=H.

The clock generator 30 generates three clocks CLK1, CLK2 and CLK3 of different frequencies $f_{CLK1}$, $f_{CLK2}$ and $f_{CLK3}$ ($f_{CLK1} > f_{CLK2} > f_{CLK3}$)

The clock selection circuit 30 selects one of the clocks CLK1, CLK2 and CLK3. Table 3 shows the function of the clock selection circuit 30.

TABLE 3

| H3 | H2 | H1 | L1 | L2 | L3 | Selected clock |
|---|---|---|---|---|---|---|
| H | H | H | H | H | H | CLK1 |
| L | H | H | H | H | H | CLK2 |
| L | L | H | H | H | H | CLK3 |
| L | L | L | H | H | H | None |
| L | L | L | L | H | H | CLK3 |
| L | L | L | L | L | H | CLK2 |
| L | L | L | L | L | L | CLK1 |

Thus, the relationship between the voltage value of the power supply voltage VCC and the clock selected by the clock selection circuit 30 is as shown in Table 4.

TABLE 4

| VCC | Selected clock |
|---|---|
| VCC ≧ VH3 | CLK1 |
| VH3 ≧ VCC ≧ VH2 | CLK2 |
| VH2 ≧ VCC > VH1 | CLK3 |
| VH1 ≧ VCC > VL1 | |
| VL1 > VCC ≧ VL2 | CLK3 |
| VL2 > VCC ≧ VL3 | CLK2 |
| VL3 > VCC | CLK1 |

The count operation of the N-bit overflow up/down counter 31 is controlled by the counter control signals UP, DOWN and HOLD output by the counter control circuit 28. The counter 31 counts the clock selected by the clock selection circuit 30, and outputs the count values D0 (LSB), D1, D2, ..., Dn (MSB) as the output signals of the control circuit 23.

Table 5 shows the function of the N-bit overflow up/down counter 31. When the counter 31 overflows in the up or down count operation, the counter 31 stops counting.

TABLE 5

| UP | DOWN | HOLD | Counter 31 |
|---|---|---|---|
| H | L | L | up count |
| H | L | H | hold |
| L | H | L | down count |

Figure 4:
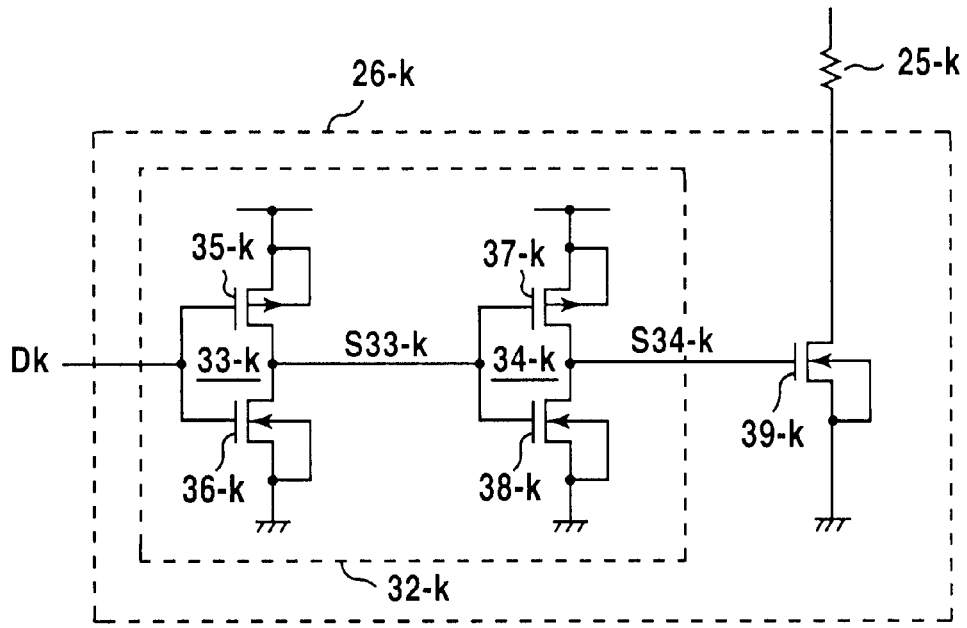
FIG. 4 is a circuit diagram of a connection switch of the shunt regulator shown in FIGS. 2 and 3.

FIG. 4 is a circuit diagram of the connection switch circuit 26-k (k=1, 2, ..., n). The connection switch circuit 26-k includes a delay circuit 32-k, which includes inverters 33- and 34-k and delays an output signal Dk of the control signal 23. The inverter 33-k is made up of a P-channel MOS (pMOS) transistor 35-k and an N-channel MOS (nMOS) transistor 36-k. The inverter 34-k is made up of a P-channel MOS transistor 37-k and an N-channel MOS transistor 38-k. The connection switch circuit 26-k further includes an N-channel MOS transistor 39-k which acts as a connection switch.

When the output signal Dk of the control signal 23 is H (high level), the output of the inverter 33-k is L (low level), and the output of the inverter 34-k is H. Thus, the nMOS transistor 39-k is turned ON. In contrast, when the output signal Dk is L, the output of the inverter 33-k is H, and the output of the inverter 34-k is L. Thus, the nMOS transistor 39-k is turned OFF. Thus, the magnitude of regulation by the shunt regulator 22 is determined by the output signals D0–Dn of the control circuit 23.

In the first embodiment of the present invention, the gate width of the nMOS transistor 36-k is narrower than that of the nMOS transistor 38-k. Thus, the current driving ability (pull-down ability) of the nMOS transistor 36-k is less than that the current driving ability (pull-down ability) of the nMOS transistor 38-k. That is, the delay time of the inverter 33-k with respect to the rising edge of the output signal Dk of the control circuit 23 is designed to be equal to (ta+tc) where ta is the delay time of the inverter 34-k with respect to the rising edge of the output signal S33-k of the inverter 33-k.

The gate width of the pMOS transistor 37-k is narrower than that of the pMOS transistor 35-k. Thus, the current driving ability (pull-down ability) of the pMOS transistor 37-k is less than the current driving ability (pull-down ability) of the pMOS transistor 35-k. That is, the delay time of the inverter 34-k with respect to the falling edge of the output signal S33-k of the inverter 33-k is designed to be equal to (tb+td) where tb is the delay time of the inverter 33-k with respect to the falling edge of the output signal Dk of the control circuit 23.

Figure 5:
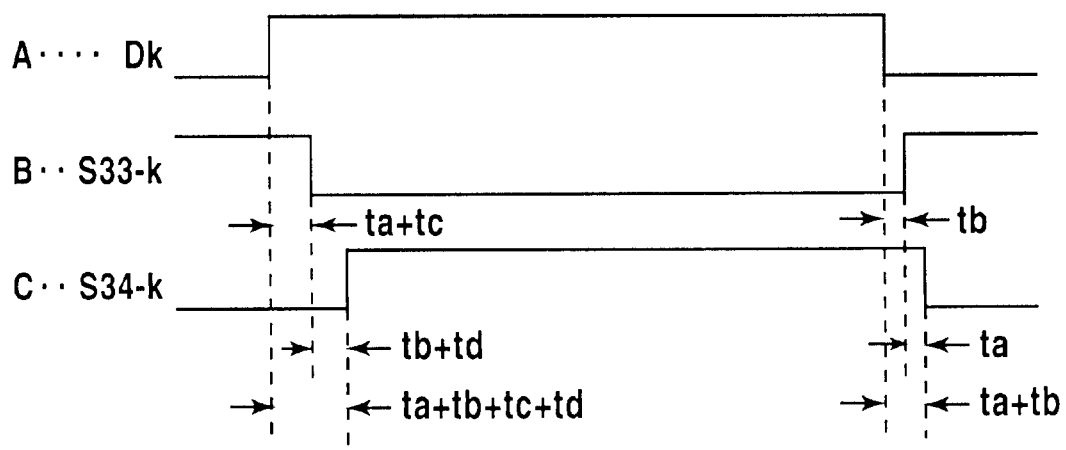
FIG. 5 is a waveform diagram of an operation of a delay circuit provided in a connection switch of the shunt regulator shown in FIGS. 2 and 3.

FIG. 5 is a waveform diagram of the operation of the delay circuit 32-k. Part A of FIG. 5 shows the waveform of the output signal Dk of the control circuit 23, and part B shows the output signal S33-k of the inverter 33-k. Further, part C of FIG. 5 shows the waveform of the output signal s34-k of the inverter 34-k. That is, the delay time of the delay circuit 32-k with respect to the rising edge of the output signal Dk of the control circuit 23 is equal to (ta+tb+tc+td). The delay time of the delay circuit 32-k with respect to the falling edge of the output signal Dk of the control circuit 23 is equal to (ta+tb). In the delay circuit 32-k, the delay time of the rising edge of the output signal Dk of the control circuit 23 is longer than that with respect to the falling edge thereof.

The reason why the delay time of the rising edge of the output signal Dk of the control signal 23 is set longer than the delay time of the falling edge thereof is to avoid a particular situation in which, when the output signals D0–Dn includes an output signal changing from H to L and another output signal changing from L to H, these signals are simultaneously H.

Figure 6:
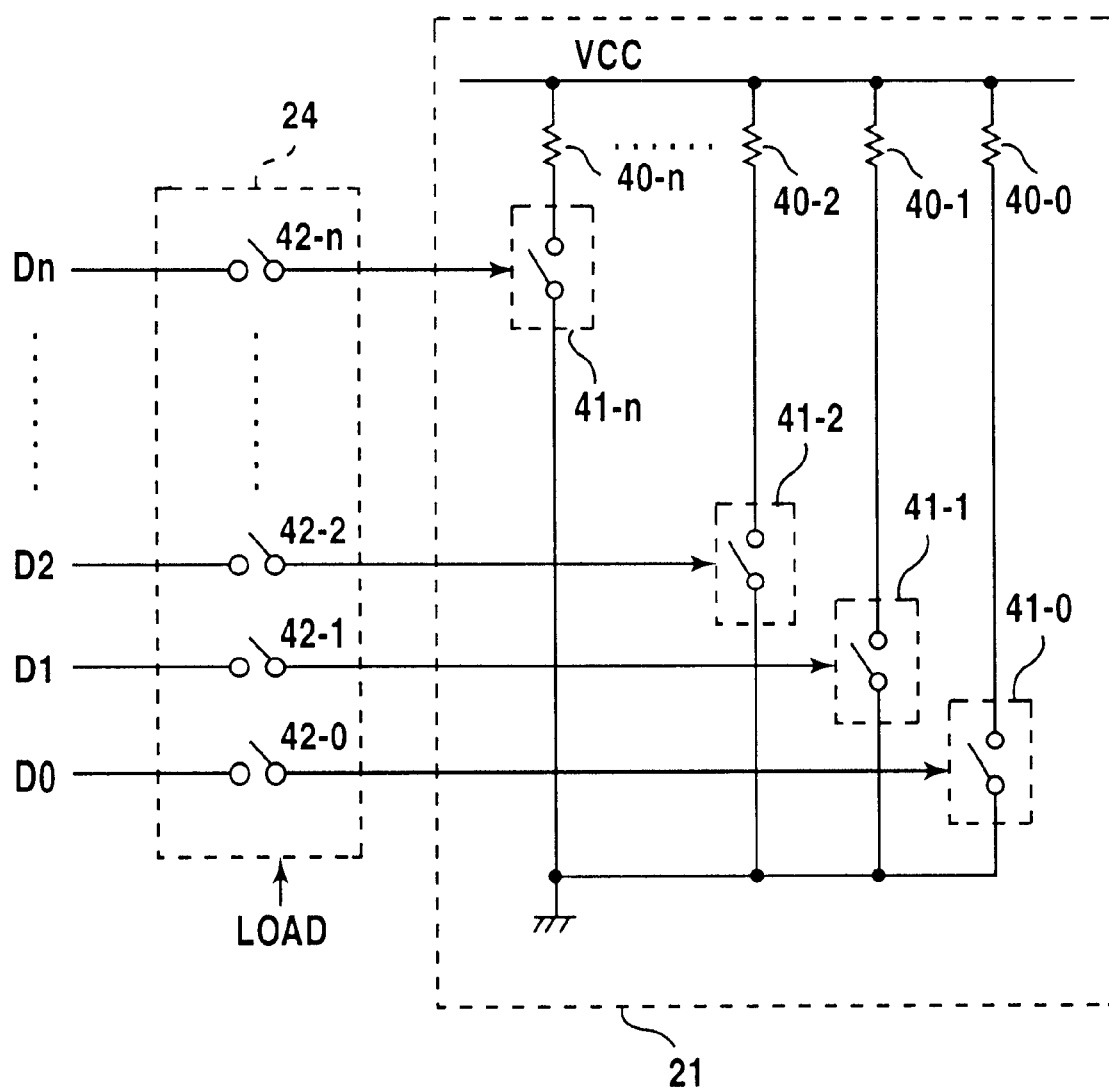
FIG. 6 is a circuit diagram of a load switch modulation circuit and a connection switch circuit used in the first embodiment of the present invention.

FIG. 6 is a circuit diagram of the load switch modulation circuit 21 and the connection switch circuit 24 shown in FIG. 2. There are illustrated load resistors 40-0, 40-1, 40-2 and 40-n. Load resistors 40-3–40-(n−1) are omitted from FIG. 6 for the sake of simplicity. There are also illustrated connection switch circuits 41-0, 41-1, 41-2 and 41-n. Connection switch circuits 41-3–41-(n−1) are omitted from FIG. 6 for the sake of simplicity. The load resistors 40-0, 40-1, 40-2 and 40-n are supplied with the output signals D0, D1, D2 and Dn of the control circuit 23 as the switch control signals.

Let RL be the resistance value of the load resistor 40-n. The resistance values of the load resistors 40-0, 40-1, 40-2 and 40-(n−1) are respectively $RL \times 2^n$, $RL \times 2^{n-1}$, $RL \times 2^{n-2}$ and $RL \times 2$. That is, the load resistor 40-k has a resistance value of $RL \times 2^{n-k}$.

In FIG. 6, there are illustrated connection switches 42-0, 42-1, 42-2 and 42-n, which are turned ON and OFF by the load signal LOAD. When the load signal LOAD is H (at the time of sending data), the connection switches are ON. When the load signal LOAD is L (at the time of receiving data), the connection switches are OFF. Connection switches 42-3–42-(n−1) are not shown in FIG. 6 for the sake of simplicity.

In the non-contact type IC card system thus configured, the read/write unit 11 and the non-contact type IC card 13 communicate with each other by electromagnetically coupling the antenna coil 12 of the read/write unit 11 and the antenna coil 14 of the non-contact type IC card 13.

The rectifying circuit 16 shown in FIG. 2 rectifies the received signal from the antenna coil 14 and thus produces the power supply voltage VCC, which is applied to the blocks as shown in FIG. 2.

Figure 7:
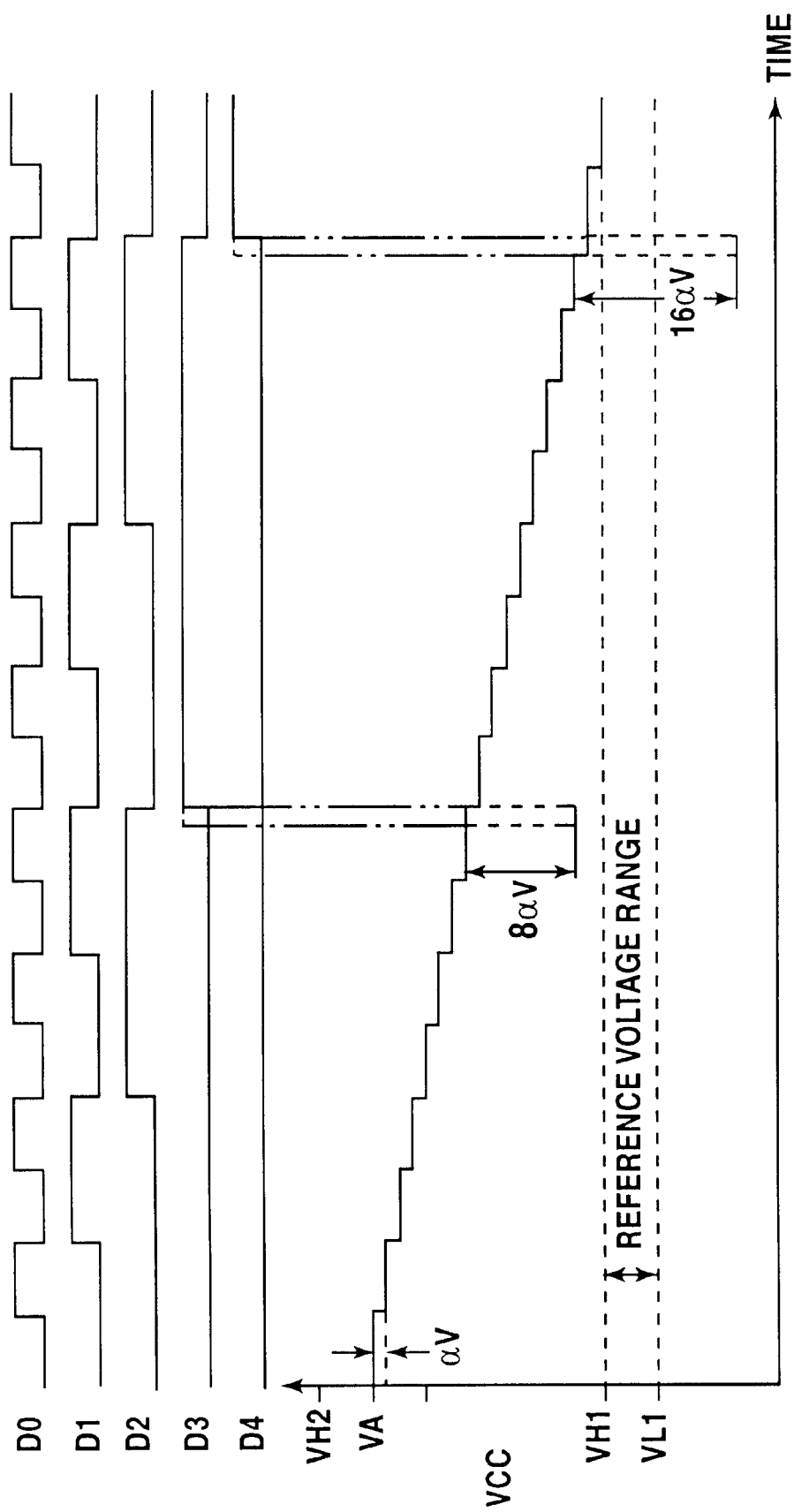
FIGS. 7, 8 and 9 are waveform diagrams of operations of the first embodiment of the present invention.

For example, as shown in FIG. 7, if the power supply voltage VCC changes to a voltage VA between VH1–VH2 due to a certain factor, the voltage detection signals H3, H2, H1, L1, L2 and L3 output by the voltage detection circuit 27 are as follows:

H3=L, H2=L, H1=H,
L1=H, L2=H, L3=H.

Thus, the counter control signals UP, DOWN and HOLD output by the counter control circuit 28 are as follows:

UP=H, DOWN=L, HOLD=L.

Thus, the N-bit overflow up/down counter 31 is instructed to act as the up counter, and the clock selection circuit 30 selects the clock CLK3 of the lowest frequency. The selected clock CLK3 is applied to the up/down counter 31.

Thus, the up/down counter 31 counts up in synchronism with the clock CLK3 and the output signals D0–Dn serially increment from the current value. Thus, the shunt resistance value of the shunt regulator 22 is gradually reduced, and the power supply voltage VCC gradually drops from the voltage value VA.

When the power supply voltage VCC drops to the voltage VH1, the voltage detection signals H3, H2, H1, L1, L2 and L3 of the voltage detection circuit 27 become as follows:

H3=L, H2=L, H1=L
L1=H, L2=H, L3=H.

Thus, the counter control signals UP, DOWN and HOLD output from the counter control circuit 28 become as follows:

UP=H, DOWN=L, HOLD=H.

Thus, the N-bit overflow up/down counter 31 is instructed to be in the hold state.

Therefore, as long as the power supply voltage VCC falls within the reference voltage range between VH1 and VL1, the shunt regulator 22 controls the power supply voltage VCC to maintain the current power supply voltage VCC.

Figure 8:
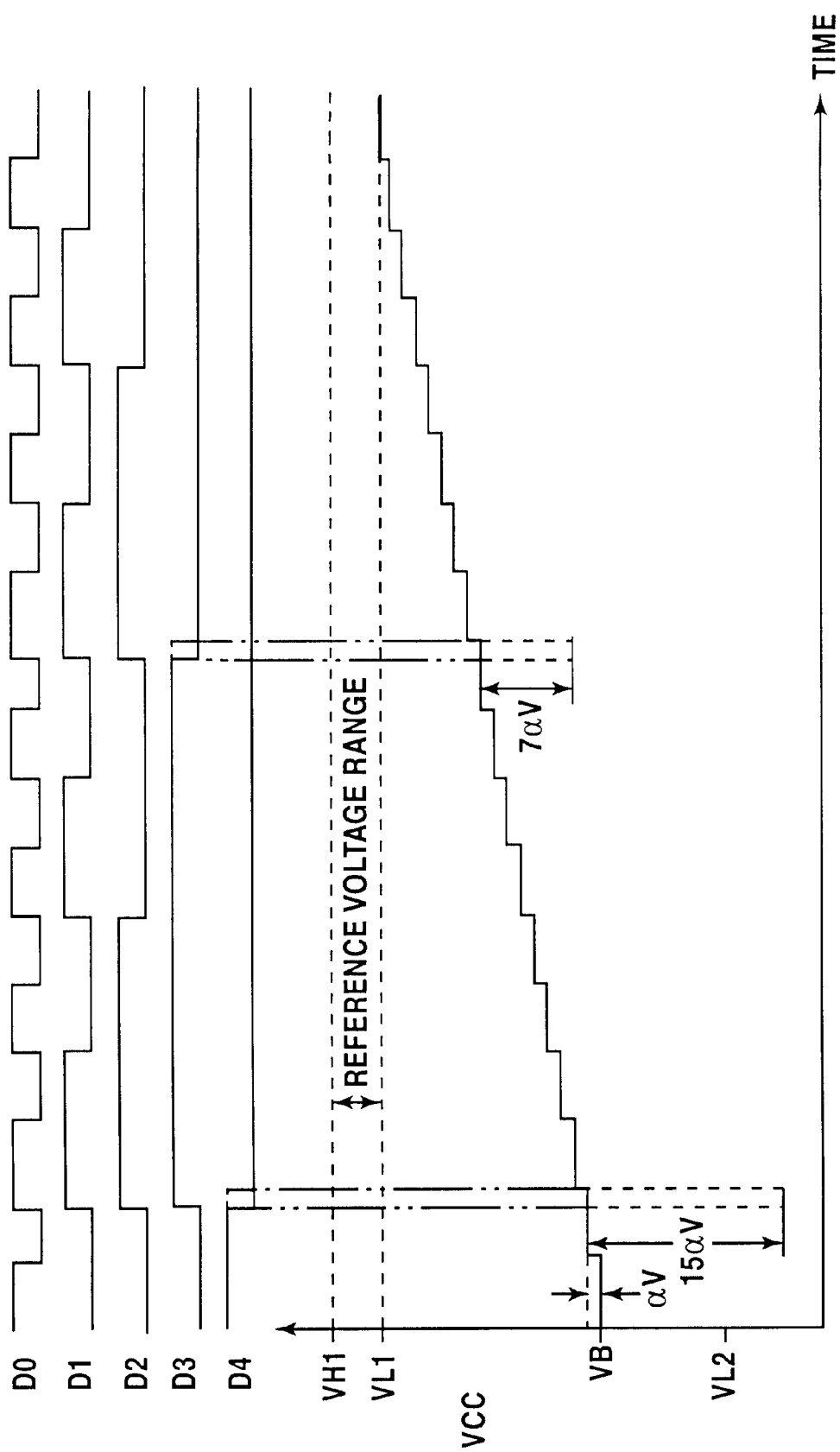

Also, as shown in FIG. 8, the power supply voltage VCC becomes equal to a voltage VB between VL1 and VL2 due to a certain factor, the voltage detection signals H3, H2, H1, L1, L2 and L3 output by the voltage detection circuit 27 are as follows:

H3=L, H2=L, H1=L,
L1=L, L2=H, L3=H.

Thus, the counter control signals UP, DOWN and HOLD output by the counter control circuit 28 are as follows:

UP=L, DOWN=H, HOLD=L.

Thus, the N-bit overflow up/down counter 31 is instructed to act as the down counter, and the clock selection circuit 30 selects the clock CLK3 of the lowest frequency. The selected clock CLK3 is applied to the up/down counter 31.

Thus, the up/down counter 31 counts down in synchronism with the clock CLK3 and the output signals D0–Dn serially decrement from the current value. Thus, the shunt resistance value of the shunt regulator 22 is gradually increased, and the power supply voltage VCC gradually rises from the voltage value VA.

When the power supply voltage VCC increases to the voltage VL1, the voltage detection signals H3, H2, H1, L1, L2 and L3 of the voltage detection circuit 27 become as follows:

H3=L, H2=L, H1=L
L1=H, L2=H, L3=H.

Thus, the counter control signals UP, DOWN and HOLD output from the counter control circuit 28 become as follows:

UP=H, DOWN=L, HOLD=H.

Thus, the N-bit overflow up/down counter 31 is instructed to be in the hold state.

Therefore, as long as the power supply voltage VCC falls within the reference voltage range between VH1 and VL1, the shunt regulator 22 controls the power supply voltage VCC to maintain the current power supply voltage VCC.

For example, if the pMOS transistors 35-k and 37-k and the nMOS transistors 36-k and 38-k shown in FIG. 4 have an identical size so that the pMOS transistors 35-k and 37-k have an identical current driving ability and the nMOS transistors 36-k and 38-k have an identical driving ability, the delay circuit 32-k operates so that the delay time of the rising edge of the output signal Dk is equal to the delay time of the falling edge thereof.

In the above case, if the nMOS transistors 39-0–39-n acting as the connection switches include a switch changing from ON to OFF and another switch changing from OFF to ON, a period may occur during which the above switches are simultaneously ON.

For example, as shown in FIG. 7, when the output signals D0–D2 of the control circuit 23 changes from H to L, and the output signal D3 changes from L to H, a period may occur during which the nMOS transistors 39-0–39-3 are simultaneously ON. In the above case, if the power supply voltage VCC drops by a voltage level aV for every cycle of the clock CLK3, the power supply voltage VCC rapidly drops by 8αV from the voltage at that time.

Also, for example, if the output signals D0–D3 change from H to L and the output signal D4 changes from L to H, a period may occur during which the nMOS transistors 39-0–39-3 are simultaneously ON. In the above case, the power supply voltage VCC rapidly drops by 16αV from the voltage at that time.

For example, if the power supply voltage VCC becomes close to the upper limit VH1 of the range between VH1 and VL1 and abruptly drops greatly, the low-voltage detection circuit in the data processing circuit 18 detects a situation in which the power supply voltage VCC decreases to the given low voltage or lower. Thus the CPU is inhibited from accessing the memory, so that an abnormality occurs in communication.

For example, as shown in FIG. 8, if the output signals D0–D3 change from L to H and the output signal D4 changes from H to L, a period may occur during which the nMOS transistors 39-0–39-4 are simultaneously ON. In the above case, if the power supply voltage VCC increases by αV for every cycle of the clock CLK3, the power supply voltage VCC rapidly drops by 15αV from the voltage at that time.

For example, when the output signals D0–D2 of the control circuit 23 changes from L to H, and the output signal D3 changes from H to L, a period may occur during which the nMOS transistors 39-0–39-3 are simultaneously ON. In the above case, the power supply voltage VCC rapidly drops by 7αV from the voltage at that time.

For example, if the power supply voltage VCC becomes close to the upper limit VL1 of the range between VH1 and VL1 and abruptly drops greatly, the low-voltage detection circuit in the data processing circuit 18 detects a situation in which the power supply voltage VCC decreases to the given low voltage or lower. Then the CPU is inhibited from accessing the memory, so that an abnormality occurs in communication.

With the above in mind, the LSI device 15 of the first embodiment of the present invention is configured so that the delay circuit 32-k forming the connection switch circuit 26-k of the shunt regulator 22 operates in such a manner that the delay time of the rising edge of the output signal Dk is longer than the falling edge thereof. With the above structure, it is possible to avoid a situation in which, when the nMOS transistors 39-0–39-n respectively forming the connection switch circuits 26-0–26-n includes a connection switch changing from ON to OFF and another connection switch changing from OFF to ON, these connection switches are simultaneously ON so that the power supply voltage VCC abruptly drops greatly during the process of returning the power supply voltage VCC to the reference voltage range between VH1 and VL1.

Figure 9:
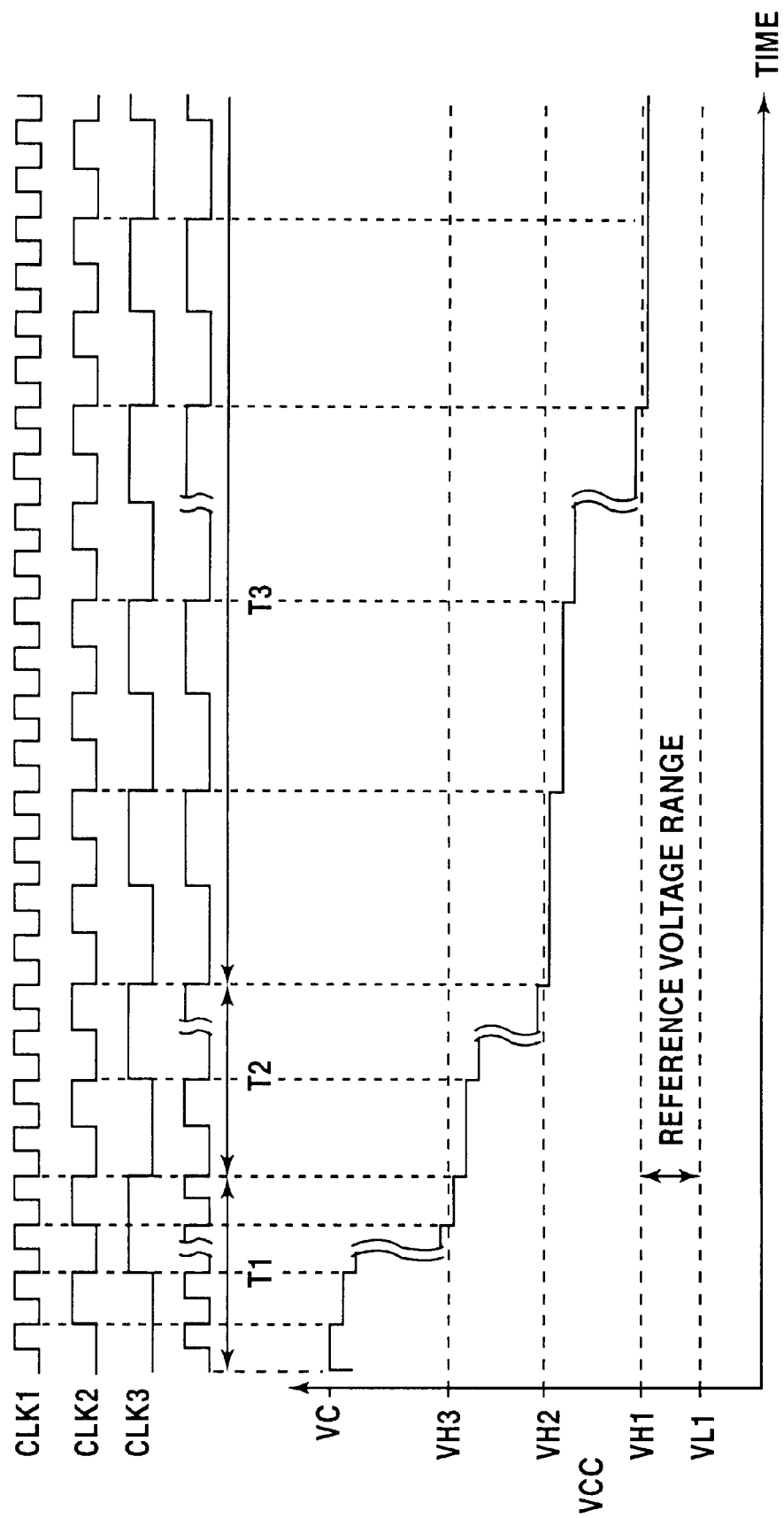

For example, as shown in FIG. 9, if the power supply voltage increases to a voltage VC higher than the voltage VH3 due to a certain factor, the voltage detection signals H3, H2, H1, L1, L2 and L3 of the voltage detection circuit 27 become as follows:

H3=H, H2=H, H1=H
L1=H, L2=H, L3=H.

Thus, the counter control signals UP, DOWN and HOLD output from the counter control circuit 28 become as follows:

UP=H, DOWN=L, HOLD=L.

Thus, the N-bit overflow up/down counter 31 is instructed to act as the up counter, and the clock selection circuit 30 selects the clock CLK1 of the highest frequency, which is applied to the N-bit overflow up/down counter 31.

Thus, the up/down counter 31 counts up in synchronism with the clock CLK1, and the output signals D0–Dn thereof increment. Thus, the shunt resistance value of the shunt regulator 22 gradually reduces from a certain value, and the power supply voltage VCC gradually decreases from the voltage VC.

When the power supply voltage VCC drops to the voltage VH3, the voltage detection signals H3, H2, H1, L1, L2 and L3 of the voltage detection circuit 27 become as follows:

H3=L, H2=H, H1=H
L1=H, L2=H, L3=H.

Thus, the clock selection circuit 30 selects the clock CLK2 of the frequency lower than that of the clock CLK1. The clock CLK2 thus selected is applied to the N-bit overflow up/down counter 31. Thus, the power supply voltage VCC decreases at a speed slower than that at which the power supply voltage VCC drops from VC to VH3 with period T1.

When the power supply voltage VCC drops to the voltage VH2, the voltage detection signals H3, H2, H1, L1, L2 and L3 of the voltage detection circuit 27 become as follows:

H3=L, H2=L, H1=H
L1=H, L2=H, L3=H.

Thus, the clock selection circuit 30 selects the clock CLK3 of the frequency lower than that of the clock CLK2. The clock CLK3 thus selected is applied to the N-bit overflow up/down counter 31. Thus, the power supply voltage VCC drops at a speed slower than that at which the voltage VCC drops from VH3 to VH2 with a period T2.

When the power supply voltage VCC decreases to the voltage VH1, the voltage detection signals H3, H2, H1, L1, L2 and L3 of the voltage detection circuit 27 become as follows:

H3=L, H2=L, H1=L
L1=H, L2=H, L3=H.

Thus, the counter control signals UP, DOWN and HOLD output from the counter control circuit 28 become as follows:

UP=H, DOWN=L, HOLD=H.

Thus, the N-bit overflow up/down counter 31 is instructed to be in the hold state.

Thus, as long as the power supply voltage VCC falls within the range between VH1 and VL1, the shunt regulator 22 controls the power supply voltage VCC so that the current power supply voltage VCC is maintained.

In case where the clocks CLK2 and CLK3 are not used, and only the clock CLK1 of the highest frequency is used, the voltage detection signals H3–H1 and L1–L3 changes too fast, and the power supply voltage VCC which becomes close to the reference voltage range between VH1 and VL1 will fluctuate during the process of returning VCC to the range. Thus, it is difficult to return the power supply voltage VCC to the reference voltage range between VH1 and VL1 in stable fashion.

With the above in mind, according to the first embodiment of the present invention, the clock CLK1 of the highest frequency is used in the case where the power supply voltage VCC exceeds the reference voltage range between VH3 and VL3 and is far away from the reference voltage range between VH1 and VL1 because there is no possibility that the power supply voltage VCC may fluctuate. By using the clock CLK1 of the highest frequency, it is possible to rapidly return the power supply voltage to the voltage range between VH3 and VL3. If the power supply voltage VCC is lower than the range between VH3–VL3 and is equal to or higher than the range between VH2 and VL2, the clock CLK2 of the frequency lower than that of the clock CLK1 is selected to return the voltage VCC to the range between VH2 and VL2. If the power supply voltage VCC is lower than the range between VH2 and VL2 and is equal to or higher than the range between VH1 and VL1, the clock CLK3 of the lowest frequency is selected. Thus, the power supply voltage VCC can be rapidly returned to the reference voltage range between VH1 and VL1 in stable fashion as a whole.

As described above, according to the first embodiment of the present invention, it is possible to return the power supply voltage VCC to the reference voltage range between VH1 and VL1 even if the power supply voltage becomes higher than the upper limit voltage VH1 or lower than the lower limit voltage VL1 due to a certain factor.

In the first embodiment of the present invention, the resistance value of the shunt regulator 25-k of the shunt regulator 22 is (constant value)$\times 2^{n-k}$, and the connection switch circuits 26-0–26-n are supplied with the output signals D0–Dn of the N-bit overflow up/down counter 31. Thus, the shunt regulator 22 is controlled so that the shunt resistance value gradually decreases if the power supply voltage VCC is higher than the upper limit VH1 of the reference voltage range between VH1 and VL1, and gradually increases if VCC is lower than the lower limit VL1. Thus, it is possible to rapidly return the power supply voltage VCC to the reference voltage range between VH1 and VL1 while the magnitude of regulation is approximately constant.

Further, according to the first embodiment of the present invention, the delay circuit 32-k forming the connection switch circuit 26-k of the shunt regulator 22 is configured so that the delay time of the rising edge of the output signal Dk of the control circuit 23 is longer than that of the falling edge thereof. It is thus possible to avoid occurrence of a period such that, when the nMOS transistors 39-0–39-n respectively forming the connection switch circuits 26-0–26-n includes a connection switch changing from ON to OFF and another connection switch changing from OFF to ON, these connection switches are simultaneously ON and to thus prevent the power supply voltage VCC from abruptly dropping greatly during the process of returning the power supply voltage VCC to the reference voltage range between VH1 and VL1. As a result, abnormality in communication can be avoided.

According to the first embodiment of the present invention, the three clocks CLK1, CLK2 and CLK3 of the different frequencies are selectively used. Thus, even if the power supply voltage VCC greatly changes, it is possible to rapidly return the power supply voltage VCC to the reference voltage range between VH1 and VL1 in stable fashion. It is thus possible to obtain the stable power supply environment and avoid a malfunction and communication error resulting from a variation in the power supply voltage VCC, and loss of data due to such a malfunction.

A description will now be given, with reference to FIGS. 10 and 11, of a second embodiment of the present invention. In these figures, parts that are the same as those shown in the previously described figures are given the same reference numbers.

Figure 10:
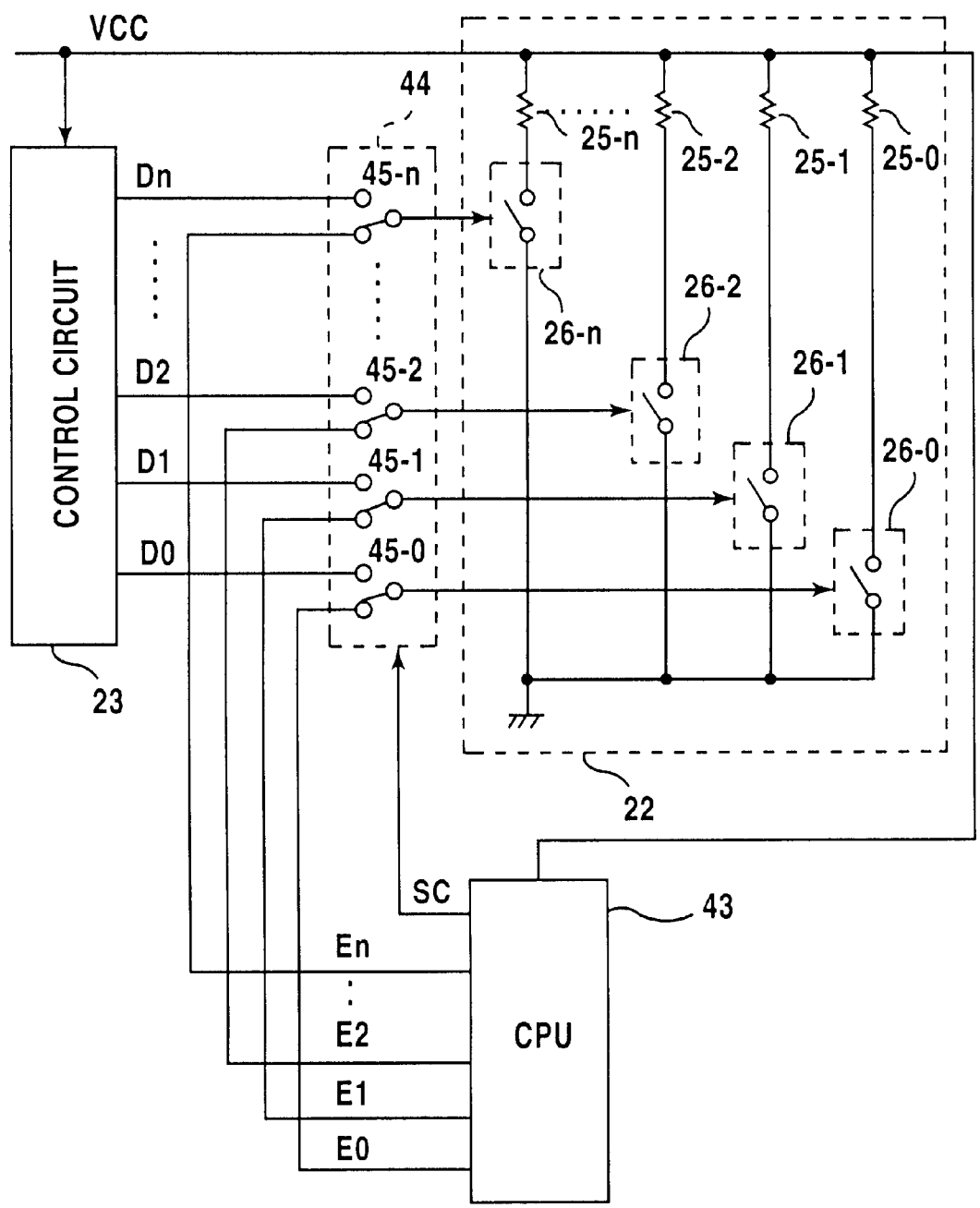
FIG. 10 is a circuit diagram of a second embodiment of the present invention.

Referring to FIG. 10, a selector 44 controlled by a CPU 43 is interposed between the control circuit 23 and the shunt regulator 22. The other portions of the circuit shown in FIG. 10 are the same as those of the circuit shown in FIG. 2.

The selector 44 has switches 45-0–45-n although only switches 45-0, 45-1, 45-2 and 45-n are illustrated for the sake of simplicity. The switch 45-k selects the output signal Dk from the control circuit 23 when a selector control signal SC output by the CPU 43 is H. The output signal Dk thus selected is supplied to the connection switch circuit 26-k. When the selector control signal SC is L, the switch 45-k selects a switch control signal Ek output by the CPU 43. The switch control signal Ek thus selected is supplied to the connection switch circuit 26-k.

Figure 11:
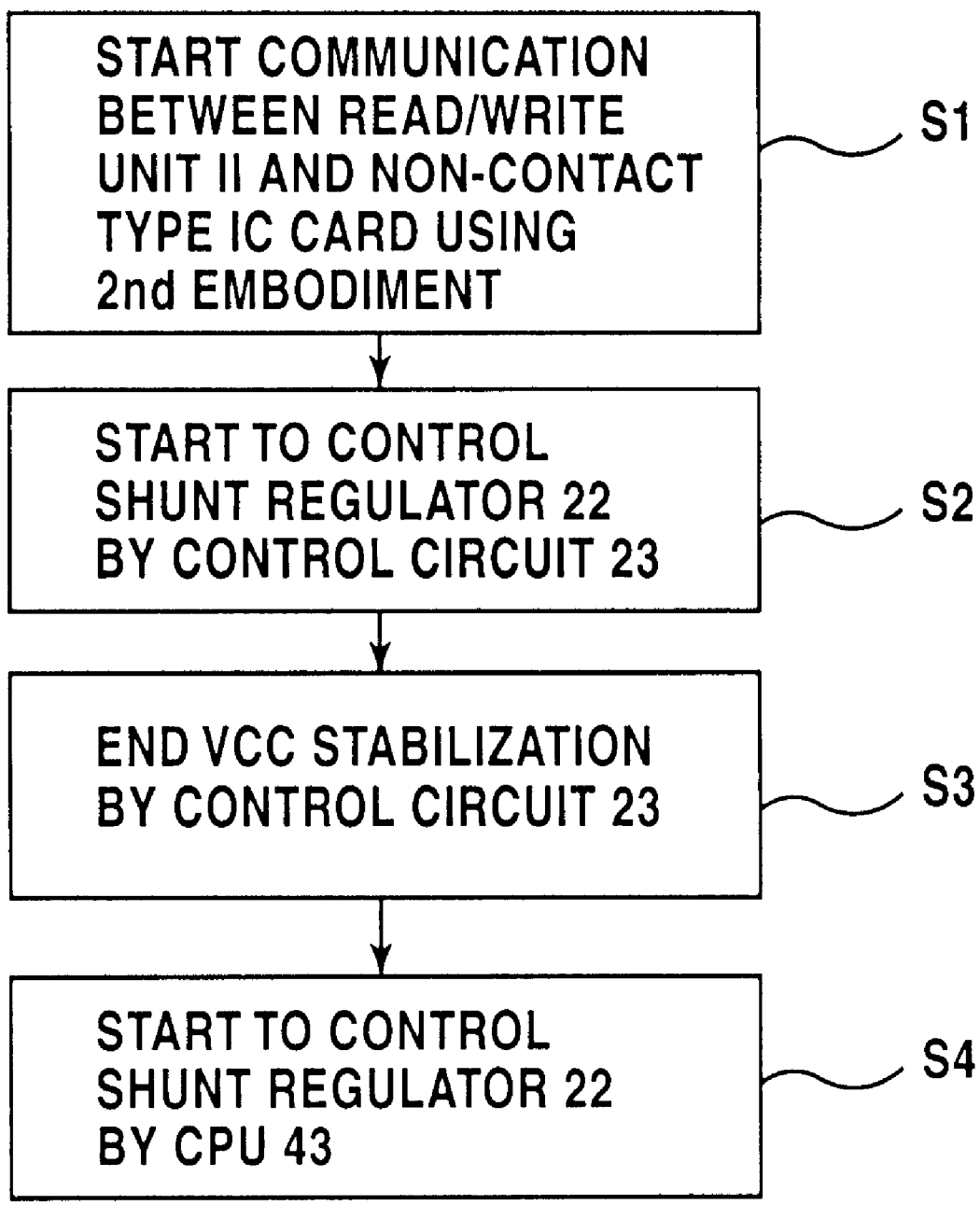
FIG. 11 is a flowchart of a power supply voltage stabilizing operation of the second embodiment of the present invention.

FIG. 11 is a flowchart of a power supply voltage stabilizing operation performed in the second embodiment of the present invention. A communication between the read/write unit 11 and the non-contact type IC card of the second embodiment of the present invention starts (step S1), the control circuit 23 starts to control the shunt regulator 22 (step S2). When the stabilization of the power supply voltage VCC by the control circuit 23 is completed (step S3), the CPU 43 starts to control the shunt regulator 22 (step S4).

The communication distance between the read/write unit 11 and the second embodiment non-contact type IC card and the amount of power supplied from the read/write unit 11 are known. When the communication distance and the amount of power are constant, the only factor which changes the power supply voltage VCC is current consumed in the individual circuits, according to the second embodiment of the invention.

Thus, it is possible for the CPU 43 to acknowledge the operating states of the individual circuits by computing the currents consumed in the individual circuits beforehand. Thus, the shunt regulator 22 can be controlled by software utilizing hardware resources such as the CPU 43 and the memory.

According to the second embodiment of the present invention, it is possible to obtain the same functions and effects as those of the first embodiment thereof and further obtain an additional advantage in which the LSI device 15 can cope with an abrupt change of the power supply voltage VCC caused when a large number of individual circuits simultaneously start to operate.

Furthermore, when the CPU 43 starts to control the shunt regulator 22 and then disables the control circuit 23, it is possible to reduce power consumption and noise.

Figure 12:
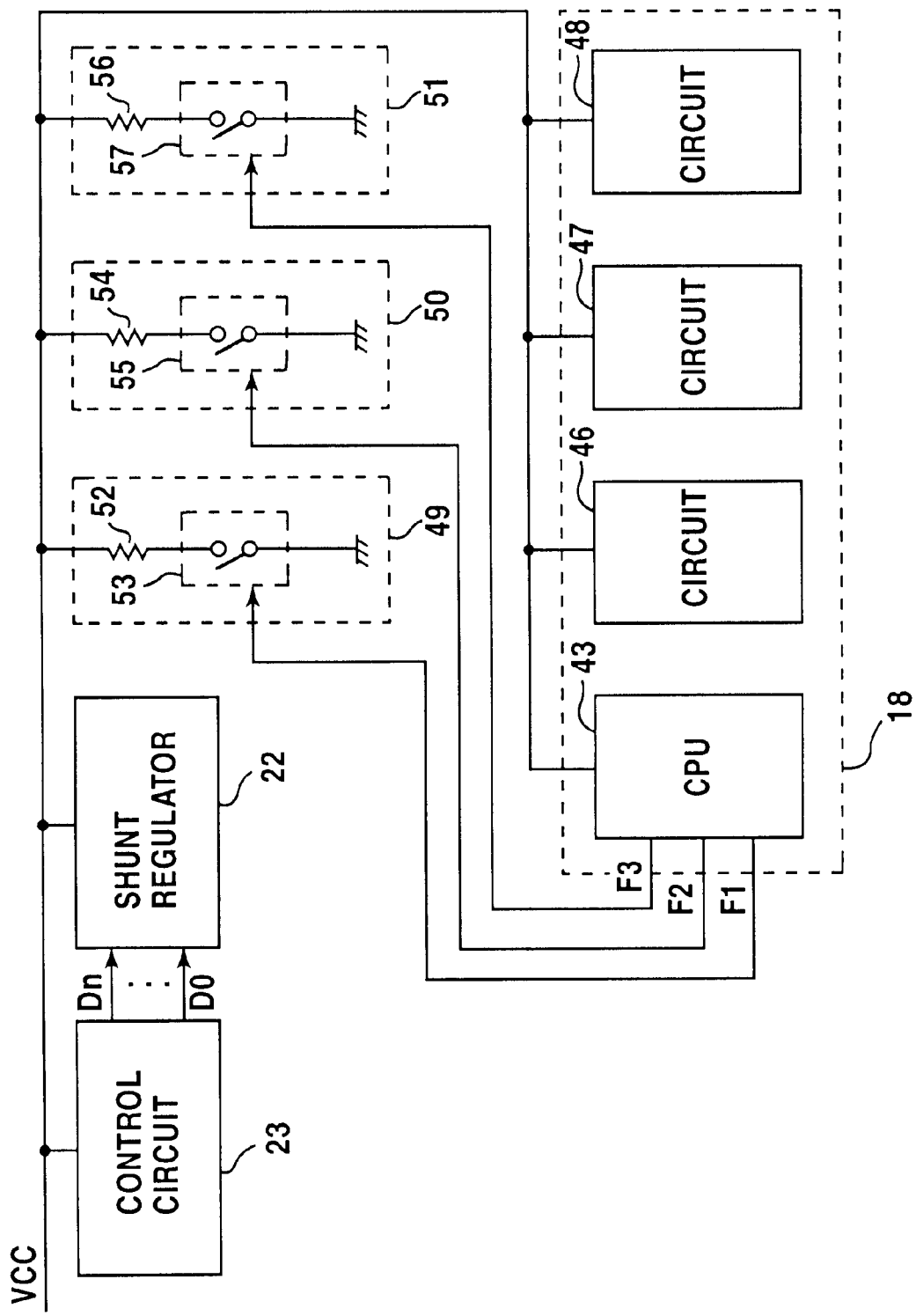
FIG. 12 is a circuit diagram of a third embodiment of the present invention.
Figure 13:
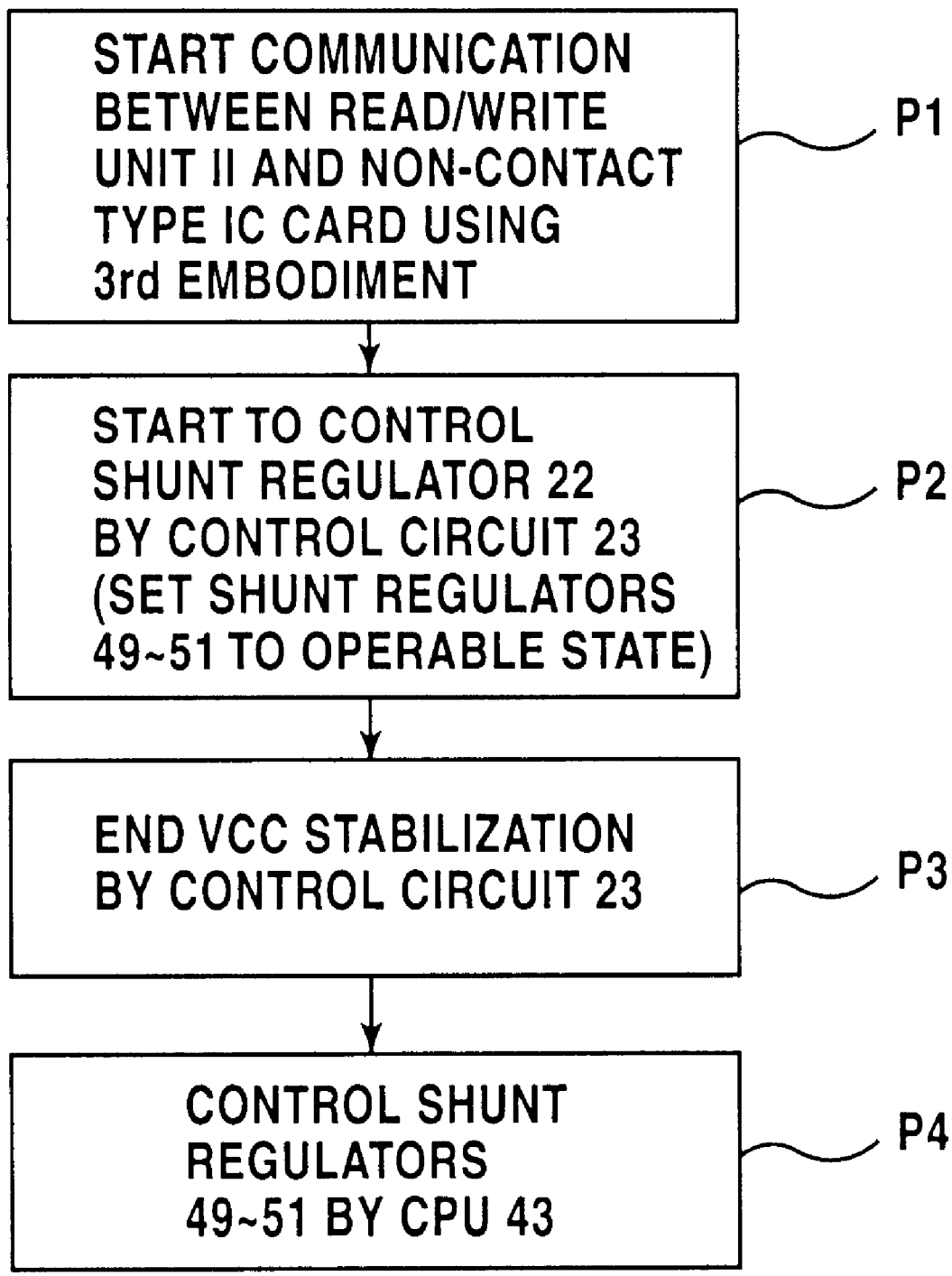
FIG. 13 is a flowchart of a power supply voltage stabilizing operation of the third embodiment of the present invention.

A description will now be given, with reference to FIGS. 12 and 13, of a third embodiment of the present invention. Referring to FIG. 12, shunt regulators 49, 50 and 51 are respectively provided to individual circuits 46, 47 and 48 such as encryption circuits and communication modules included in the data processing circuit 18. The shunt regulators 49, 50 and 51 are controlled by the CPU 43. The other parts of the LSI device according to the third embodiment of the present invention are the same as those of the LSI device 15 according to the first embodiment thereof.

The shunt regulator 49 includes a shunt resistor 52 and a connection switch 53, which is turned ON and OFF by a shunt control signal F1 output by the CPU 43. The shunt regulator 49 is configured so that, when the connection switch 53 is ON, the same amount of shunt current as that of current flowing through the circuit 46 in the operating mode flows in the shunt regulator 49.

The shunt regulator 50 includes a shunt resistor 54 and a connection switch 55, which is turned ON and OFF by a shunt control signal F2 output by the CPU 43. The shunt regulator 50 is configured so that, when the connection switch 55 is ON, the same amount of shunt current as that of current flowing through the circuit 47 in the operating mode flows in the shunt regulator 50.

The shunt regulator 51 includes a shunt resistor 56 and a connection switch 57, which is turned ON and OFF by a shunt control signal F3 output by the CPU 43. The shunt regulator 51 is configured so that, when the connection switch 57 is ON, the same amount of shunt current as that of current flowing through the circuit 48 in the operating mode flows in the shunt regulator 51.

FIG. 14 is a flowchart of a power supply voltage stabilizing operation according to the third embodiment of the present invention. A communication between the read/write unit 11 and the non-contact type IC card of the second embodiment of the present invention starts (step P1), the control circuit 23 starts to control the shunt regulator 22 (step P2). In this case, the shunt regulators 49–51 are controlled to be operable. When the stabilization of the power supply voltage VCC by the control circuit 23 is completed (step P3), the CPU 43 starts to control the shunt regulators 49–51 as necessary (step S4).

According to the third embodiment of the present invention, it is possible to obtain the same functions and effects as those of the first embodiment thereof and further obtain an additional advantage in which the LSI device 15 can cope with an abrupt change of the power supply voltage VCC caused when the circuits 46–49 simultaneously 15 start to operate because the shunt regulators 49–51 are respectively provided to the circuits 46–49. Thus, a further stabilized power supply voltage is available. Furthermore, there is no need for computation for controlling the shunt regulator 22 performed in the second embodiment of the present invention, so that the control of the shunt regulator 22 can be simplified.

The present invention is not limited to the specifically disclosed embodiments of the present invention, and variations and modifications can be made without departing from the scope of the present invention.

What is claimed is:

1. A semiconductor integrated circuit device for a non-contact type IC card equipped with a rectifying circuit rectifying a received signal and thus producing a power supply voltage, said device comprising:

a shunt regulator which is connected between a power supply voltage and ground and controls a shunt resistance; and a control circuit which controls the shunt regulator so that:

the shunt resistance gradually decreases when the power supply voltage becomes higher than an upper limit of a reference voltage range, and gradually increases when the power supply voltage becomes lower than a lower limit thereof; and the shunt resistance remains constant when the power supply voltage falls within the reference voltage range.

2. The semiconductor integrated circuit device as claimed in claim 1, wherein the shunt regulator comprises first through (n+1)th unit shunt regulators connected in parallel, each of the first through (n+1)th unit shunt regulators comprising a shunt resistor and a connection switch circuit connected in series.

3. The semiconductor integrated circuit device as claimed in claim 2, wherein a kth unit shunt regulator (k=1, 2, ..., n+1) has a resistance value of (a constant value)×$2^{n+1-k}$.

4. The semiconductor integrated circuit device as claimed in claim 3, wherein the connection switch circuit provided in each of the unit shunt regulators comprises a connection switch connected in series to the shunt resistor, and a delay circuit supplying a control signal from the control circuit to the connection switch, the delay circuit being configured so that a delay time of an edge which turns ON the connection switch is longer than that of another edge which turns OFF the connection switch.

5. The semiconductor integrated circuit device as claimed in claim 3, wherein said control circuit comprises:
   a voltage detection circuit which detects a voltage value of the power supply voltage;
   an N-bit overflow up/down counter; and
   a counter control circuit which instructs the counter to operate as a down counter when the voltage detection circuit detects that the power supply voltage is higher than the reference voltage range and instructs the counter to operate as an up counter when the voltage detection circuit detects that the power supply voltage is lower than the reference voltage range and which instructs the counter to be in a hold state when the voltage detection circuit detects that the power supply voltage falls within the reference voltage range,
   connection switch circuits of the first through (n+1)th unit shunt regulators being supplied with output signals D0 (LSB), D1, ..., Dn (MSB) of the counter.

6. The semiconductor integrated circuit device as claimed in claim 3, further comprising a block generator generating clocks of different frequencies, and a clock selection circuit which selects one of the clocks of a higher frequency as a difference between the voltage value of the power supply voltage and the reference voltage range increases, wherein the counter counts said one of the clocks.

7. The semiconductor integrated circuit device as claimed in claim 1, further comprising a load switch modulation circuit that superimposes modulated transmission data onto the power supply voltage, said load switch modulation circuit being controlled by a switch control signal output by said control circuit and used to control the shunt regulator.

8. The semiconductor integrated circuit device as claimed in claim 7, wherein said load switch modulation circuit comprises first through (n+1)th unit load switch modulation circuits connected in parallel, each including a load resistor and a connection switch circuit connected in series, the connection switch circuits being controlled by the switch control signal supplied from the control circuit.

9. The semiconductor integrated circuit device as claimed in claim 8, wherein the load resistor of a kth unit shunt regulator (k=1, 2, ..., n+1) has a resistance of (constant value)×$2^{n+1-k}$.

10. The semiconductor integrated circuit device as claimed in claim 9, wherein the connection switch circuit provided in each of the unit shunt regulators comprises a connection switch connected in series to the shunt resistor, and a delay circuit supplying the switch control signal from the control circuit to the connection switch, the delay circuit being configured so that a delay time of an edge which turns ON the connection switch is longer than that of another edge which turns OFF the connection switch.

11. The semiconductor integrated circuit device as claimed in claim 5, further comprising a load switch modulation circuit that superimposes modulated transmission data onto the power supply voltage, said load switch modulation circuit being controlled by a switch control signal output by said control circuit and used to control the shunt regulator, wherein:
   said load switch modulation circuit comprises first through (n+1)th unit load switch modulation circuits connected in parallel, each including a load resistor and a connection switch circuit connected in series, the connection switch circuits being controlled by the switch control signal supplied from the control circuit; and
   the output signals D0, D1, ..., Dn are applied, as switch control signals, to the connection switch circuits of the first through (n+1)th unit load switch modulation circuit.

12. The semiconductor integrated circuit device as claimed in claim 1, further comprising a controller, and a switch circuit which selects one of the control circuit and the controller in order to control the shunt regulator.

13. The semiconductor integrated circuit device as claimed in claim 12, wherein the controller starts to control the shunt regulator after stabilization of the power supply voltage by the control circuit is completed.

14. The semiconductor integrated circuit device as claimed in claim 1, further comprising:
   a plurality of shunt regulators respectively provided to individual circuits which use the power supply voltage, each of the plurality of shunt regulators causing a shunt current equal to or approximately equal to a current flowing in a corresponding one of the individual circuits to flow therein; and
   a controller controlling the plurality of shunt regulators.

15. The semiconductor integrated circuit device as claimed in claim 14, wherein the controller starts to control the shunt regulator after stabilization of the power supply voltage by the control circuit is completed.

16. A non-contact type IC card comprising:
   a rectifying circuit rectifying a received signal via an antenna and thus producing a power supply voltage; and
   a semiconductor integrated circuit device comprising:
   a shunt regulator which is connected between a power supply voltage and ground and controls a shunt resistance; and
   a control circuit which controls the shunt regulator so that:
   the shunt resistance gradually decreases when the power supply voltage becomes higher than an upper limit of a reference voltage range, and gradually increases when the power supply voltage becomes lower than a lower limit thereof; and
   the shunt resistance remains constant when the power supply voltage falls within the reference voltage range.

* * * * *